(12) United States Patent
Murali et al.

(10) Patent No.: US 10,805,884 B2
(45) Date of Patent: Oct. 13, 2020

(54) POWER-SAVE SYSTEM FOR DETECTION OF BLUETOOTH LONG RANGE PACKETS

(71) Applicant: Silicon Laboratories Inc., Austin, TX (US)

(72) Inventors: Partha Sarathy Murali, Sunnyvale, CA (US); SuryaNarayana Varma Nallaparaju, Vizianagaram (IN)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 16/538,797

(22) Filed: Aug. 12, 2019

(65) Prior Publication Data

US 2019/0364504 A1    Nov. 28, 2019

Related U.S. Application Data

(63) Continuation of application No. 16/221,561, filed on Dec. 16, 2018, now Pat. No. 10,425,895.

(60) Provisional application No. 62/599,556, filed on Dec. 15, 2017.

(51) Int. Cl.

| | |
|---|---|
| *H04W 52/02* | (2009.01) |
| *H04W 4/80* | (2018.01) |
| *H04B 7/00* | (2006.01) |
| *H04W 84/12* | (2009.01) |

(52) U.S. Cl.
CPC .......... *H04W 52/0229* (2013.01); *H04B 7/00* (2013.01); *H04W 4/80* (2018.02); *H04W 84/12* (2013.01)

(58) Field of Classification Search
CPC ... H04W 52/0229; H04W 4/80; H04W 84/12; H04B 7/00
USPC ........................................................ 455/41.2
See application file for complete search history.

(56) References Cited

U.S. PATENT DOCUMENTS

| | | | | |
|---|---|---|---|---|
| 2009/0015223 | A1* | 1/2009 | Kakehi | ................... H02M 3/00 323/282 |
| 2010/0067626 | A1* | 3/2010 | Sankabathula | ......... H04L 1/206 375/345 |
| 2019/0059055 | A1* | 2/2019 | Murali | ............. H04W 52/0216 |
| 2019/0191374 | A1* | 6/2019 | Murali | .................... H04W 4/80 |

\* cited by examiner

*Primary Examiner* — Eugene Yun
(74) *Attorney, Agent, or Firm* — File-EE-Patents.com; Jay A. Chesavage

(57) ABSTRACT

A preamble detector for a Bluetooth Long Range includes a receiver for forming baseband samples from Bluetooth packets and a preamble detect controller for enabling and disabling power to the receiver. Where the preamble duration is Tcyc, the preamble detector turns on for a preamble detect time T1 and turns off for a duration T2, where T2=Tcyc−2*T1. A series of hierarchical decisions is made on sequentially increasing intervals of time based on an accumulated correlation result of correlating the baseband samples against a SYNC sequence to power the receiver back down before the end of the T1 period when the accumulated correlation result is below a threshold and continues to a subsequent correlation interval when the accumulated correlation result is above a threshold, where the threshold is established to have at least a 20% false alarm rate for preamble detection.

15 Claims, 4 Drawing Sheets

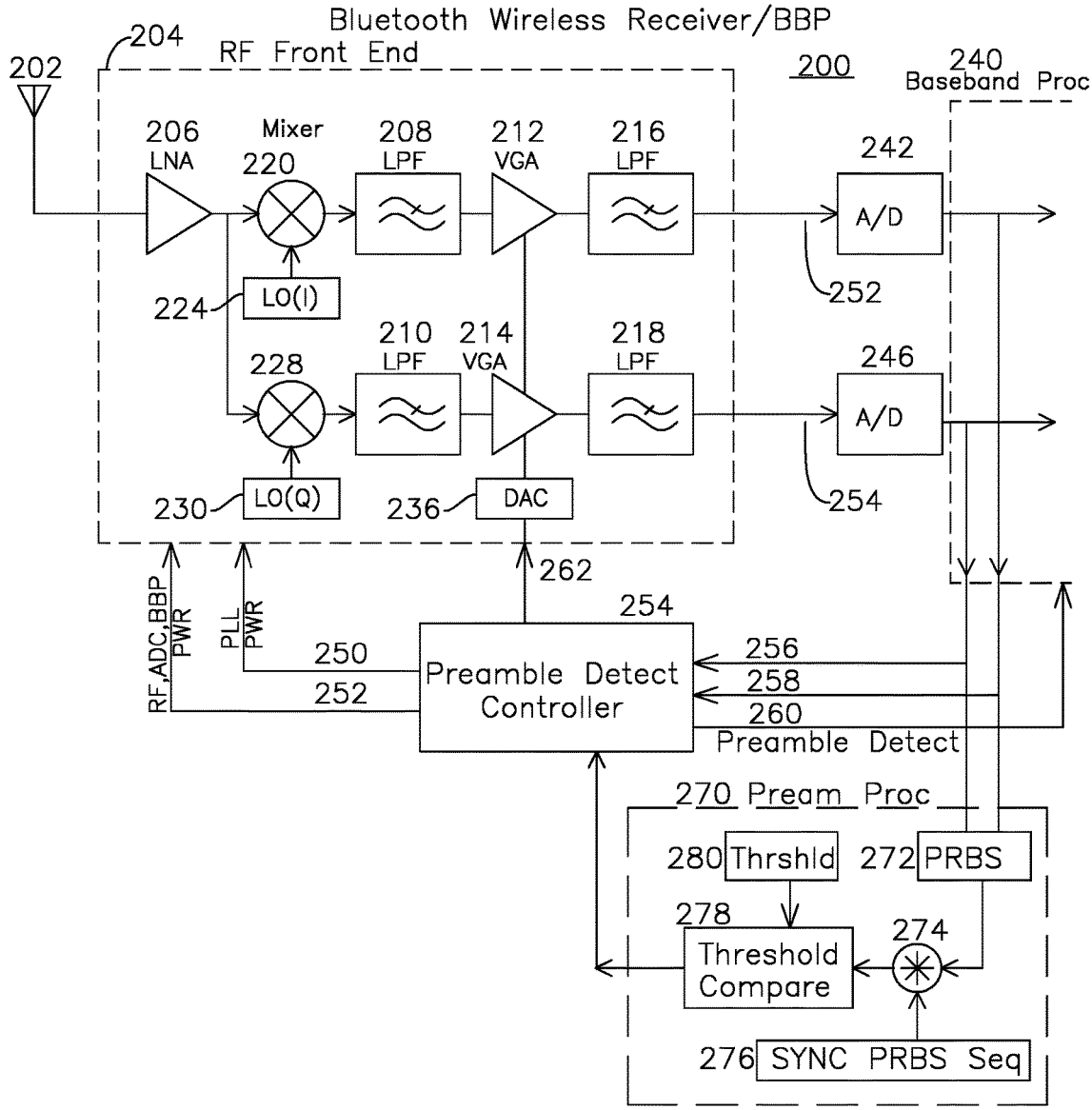

Energy Sampling

Preamble Detect Cntrlr Process

Figure 5A Preamble Correlation, Bluetooth LR Preamble

Figure 5B Example Tree for 20% False PD on 8us BTLR Preamble Corr (fixed threshold)

Figure 5C For Corr_threshold set to 20% FA on BTLE Preamble Correlation

| Sample Len | Likelihood of PLCP Correlation >Threshold |
|---|---|
| 8us | 80% |
| 16us | 80% + 16% = 96% |
| 32us | 80% + 16% + 3.84% = 99.84% |
| 64us | 80%+16%+3.84%+.1597%=99.9997% |

Avg time PD function is enabled:
8us*(1)+8us*(.2)+16us*(.04)+32us(.0016)
=10.2us (2.2us beyond 1st 8us)

POWER-SAVE SYSTEM FOR DETECTION OF BLUETOOTH LONG RANGE PACKETS

FIELD OF THE INVENTION

The present invention relates to an apparatus and method detection of Bluetooth packets. In particular, the invention relates to detection of Bluetooth Long Range (BTLR) packets.

BACKGROUND OF THE INVENTION

In low power communications equipment, it is desired to reduce the power consumption requirements. For a battery powered network station, the interval during which the device is powered on governs the battery life. For a network station listening for wireless packets, the packets may asynchronously arrive, requiring that the network station be powered continuously.

It is desired to provide a method for reducing power consumption in a wireless Bluetooth receiver which may receive packets from remote stations, while ensuring that no such packets are missed.

OBJECTS OF THE INVENTION

A first object of the invention is a low power receiver for Bluetooth wireless packets, the Bluetooth wireless packets having a Bluetooth preamble length of Tpre, the wireless receiver having a preamble detection time of Tpd, the low power receiver performing a series of variable length preamble detection cycles, each cycle of length Tcyc having a duration equal to or less than a shortest expected packet preamble to be detected, each Tcyc having an operative interval T1 for determining a preamble correlation match, the low power receiver powering down during a subsequent T2 interval, the length of the T1 interval equal to or greater than the preamble detection time Tpd, and the length of the T2 interval being Tcyc less two times T1.

A second object of the invention is a low power receiver for wireless packets using a decision hierarchy operative over a series of correlation results, the decision hierarchy operative over a series of successively longer time intervals, the results of each time interval being used to decide whether to continue on to a subsequent time interval or to power down the receiver until a subsequent T1 interval begins, the decision to continue to the next interval or to power down being made based on a preamble correlation result which exceeds a threshold for each preamble detection cycle, each threshold decision being made on an interval of time where the threshold is set for a false alarm rate (false alarm being a correlated preamble result which is greater than a threshold but for a signal which is not a preamble), the false alarm rate preferably approximately 20% or more, over a given correlation interval such as 8 us.

SUMMARY OF THE INVENTION

A receiver for Bluetooth Long Range (BTLR) packets has a receiver for amplification and conversion of received wireless signals to analog baseband signal, an analog to digital converter for converting the analog baseband signal to digital samples, the digital samples coupled to a cross correlator which correlates the baseband samples of a preamble sequence against a SYNC PRBS sequence, the output of the correlator coupled to a threshold comparator for comparing each preamble symbol which is received against a threshold. The Bluetooth LR preamble is 80 us, comprising 10 repetitions of the preamble symbol sequence '00111100'b (binary), which affords 10 or more opportunities to detect the preamble sequence, depending on how long a sub-sequence is used of the 8 bit preamble symbol sequence. Alternatively, variations in length of the sequence may be used, such as '1111000011110000'b, or any other sequence containing a repeating part of the Bluetooth preamble sequence. The wireless receiver is powered on for a nominal sampling interval T1 and then powered down during a second interval T2, where 2*T1+T2 has a cycle time Tcyc which is approximately equal to a preamble of the wireless packet to be detected. In an example embodiment, the wireless packets are sampled by an analog to digital converter and coupled to a preamble processor for cross correlation against a SYNC sequence, the correlation result compared to a threshold value during the T1 correlation interval. The correlation result for each 8 bit preamble sequence during the T1 interval is examined for cumulative likelihood of False Alarm Rate (FAR) by comparing the correlation result for each preamble sequence to a nominal FAR such as 20% over each preamble sequence, so that if the correlation result does not exceed a threshold value for a PRBS sequence during an initial interval of T1, the receiver is powered down until a subsequent cycle. In this manner, the receiver continues on to complete subsequent preamble sampling and subsequent packet processing when the likelihood of a preamble being present is high, as determined by several cycles of successful correlation forming an accumulated result which exceeds a threshold). Conversely, the receiver powers down when the likelihood of a preamble being present is low after several preamble sequence comparisons using a threshold associated with a comparatively high FAR.

BRIEF DESCRIPTION OF THE DRAWINGS

FIG. 1 shows a prior art Bluetooth Long Range packet format

FIG. 2 shows a block diagram for a Bluetooth receiver.

FIGS. 5A and 5B show a decision tree for preamble correlation of a Bluetooth LR preamble.

FIG. 5C shows a table of likelihood of false alarm for various decision points of FIG. 6A

DETAILED DESCRIPTION OF THE INVENTION

Figure 3:
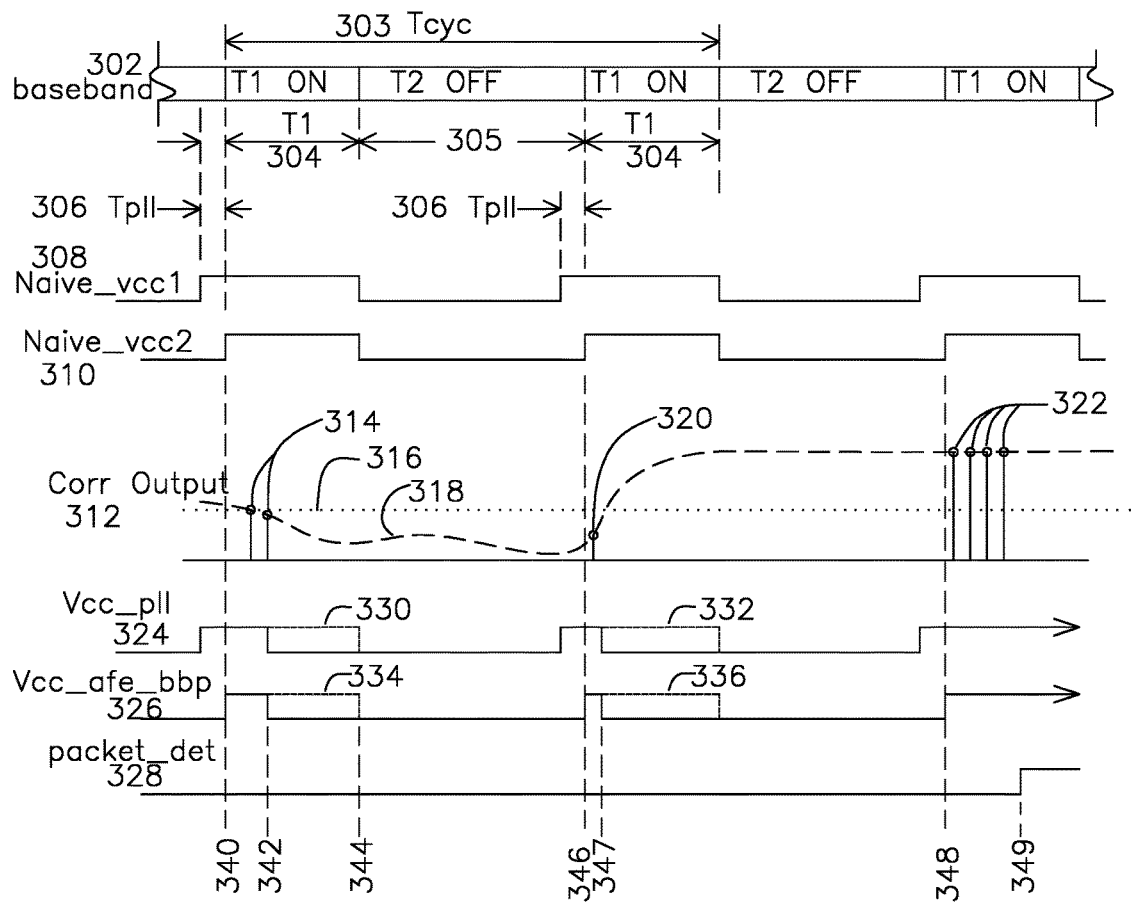
FIG. 3 shows a plot of waveforms for operation of an example preamble detect controller of FIG. 2.

FIG. 1 shows a prior art Bluetooth Long Range packet 100, which has a preamble field 102 approximately 80 us long, which is followed by various fields of the packet 104, including an access address, CI field, Term 1 field, the variable length data part of the packet PDU, CRC for error checking and packet data validation, and a Term 2 interval. It is desired for the receiver to be powered on at periodic intervals to check for a preamble 106, and if a preamble is present, remaining powered on to recover the remainder of the packet fields 104, otherwise powering down until the next preamble detection period.

FIG. 2 shows an example RF receiver 200, having an antenna 202, RF front end 204 with low noise amplifier 206, quadrature mixers 220 and 228, local oscillators 230 and 224 for conversation of received RF to baseband, low pass (or optionally band pass) filters 208 and 210, variable gain amplifiers 212 and 214 for performing gain control, filters 216 and 218, and analog to digital converters 242 and 246, which are operative at a sufficiently low sample rate such as 0.5 us to detect each preamble sequence present during the preamble interval of a Bluetooth packet which occurs at a 1 MBps rate. Preamble detect controller 254 generates the various signals for controlling the power distribution and signal examination for the various signals required for the preamble detection to occur. The preamble processor 270 accepts the quadrature outputs from the ADCs 242 and 246, converts 272 them to a single stream of digital values, and furnishes the stream to correlator 274 which is operative to correlate the incoming stream from 272 and a SYNC PRBS sequence 276, such as '00111100'b for each of the 10 preamble sequences of 106 of FIG. 1. The output of the correlator 274 is applied to a threshold comparator 278 which is operative with threshold 280. Preferably, the threshold 280 is set to give a FAR of 20% or more on a single preamble symbol used in the correlation (where the SYNC key of 276 may be of any length or sub-length of the entire 80 bit preamble sequence) which provides three or more correlation accumulation events. In the prior art, a 20% FAR would be unacceptable for a single detection sequence. However, the use of a threshold which produces a high FAR, combined with successive accumulation and examination of a subsequent preamble segment, each preamble segment independently examined for correlation greater than the threshold, quickly produces a high accuracy after a few preamble symbol correlation events, and also allows the preamble detector to powerdown early upon a correlation result which is less than the threshold, saving significant power for non-preamble events detected early. The output of each threshold comparison 278 is provided to preamble detect controller 254. Many other signals are required for operation as a Bluetooth receiver, but exemplar FIG. 2 is restricted to only the signals required for the operation of the invention. Phase lock loop (PLL) power 250 is an enable signal to provide power to the various PLLs and other oscillators which may require a settling time Tpll, which is approximately 6 us. Shortly after the PLL and other clocks are settled, RF/ADC power 252 is enabled so that all of the remaining functions required for preamble detection may occur.

FIG. 3 shows example waveforms for the operation of the invention and controller 254 of FIG. 2, in an example case where each preamble sequence is 8 bits corresponding to 8 us of a prior art Bluetooth packet. Sampling of the baseband RF is performed using A/D converters 242 and 246 of FIG. 2 which are operative on the baseband signal stream 302, which contains an additive mixture of RF from Bluetooth packets, noise, and interference from other stations in a continuous stream. The preamble detection is performed by cyclically sampling the baseband 302 signal with A/D converters 242 and 246 at a low rate during an operative T1 correlation interval 304 followed by a T2 interval 305 where the receiver is powered off and no power is consumed. The T1 304 correlation interval and T2 305 power down interval cyclically occur in a duration Tcyc 303, where Tcyc is equal to or greater than a single Bluetooth preamble sequence such as 8 us, or preferably shorter than an entire 80us preamble 106, the entire Bluetooth long range packet preamble sequence. In the case of Bluetooth Long Range, the entire packet preamble interval is 80 us long as shown in FIG. 1, comprising 10 preamble sub-sequence symbols. T1 304 is set to be a preamble detect interval Tpd, for Bluetooth, that preamble detect interval Tpd is approximately 8 us. T2 305 is established to be Tcyc−2* Tpd. In this manner, a single Tcyc 303 is ensured to contain at least two preamble detect T1 cycles, which is sufficient to detect a preamble, resulting in a guaranteed preamble detection while having the receiver powered down for the T2 interval which is a significant percentage of Tcyc, thereby reducing power consumption by 1−(2*T1/Tcyc). Waveform 308 shows a naive PLL power-on signal 308, which precedes the naive power-on signal 310 for the analog front end and A/D converters by the Tpll startup time, allowing receiver circuitry to settle after power-up. The naive PLL power-on signal 308 enabled time and naive power signal 310 enabled time represent the maximum power consumed, if the controller were to merely correlation against SYNC through the entire T1 interval of the prior art. Beyond cycling power on during T1 intervals to correlate against a preamble sequence, additional power savings are available through the present invention. A series of correlation results 312 is shown in dashed line 318, as the signal is naturally not present when the receiver is powered down, as the preamble correlation value is only available during the T1 interval. Preamble correlation signal 318 is shown as a continuous correlation result for simplicity, although preamble correlation accumulates through each preamble sequence on a bit-by-bit basis, but only when the receiver power is enabled during T1 intervals. Correlation threshold 316 is shown as a dotted line for reference. During a T1 interval from time 340 to 342, each correlation 274 result 314 is individually compared against the threshold, and as shown, the controller 254 observes that the first correlator output is above the threshold, and so continues to a second correlation result, which falls below threshold 316. Threshold 316 has been selected to provide an exemplar false alarm rate (false packet detection rate) or FAR of an exemplar 20%. Threshold 316 is settable to any particular threshold level, but the present examples are for the case corresponding to a FAR of 20%. The first accumulated correlation of 314 exceeds the threshold, but the second accumulated correlation (against a scaled threshold which accounts for two correlation intervals) does not, so the preamble detect controller terminates the acquisition of data by powering down the PLL and AFE circuits at time 342, earlier than the end of T1, which has the result of increasing the power savings with minimal risk of missing a preamble detection event. The remainder of T1 interval from 334 to 344 represents the power savings compared to having the receiver powered on during this interval. During a subsequent T1 interval at 346, the receiver is powered on, but first correlation result 320 fails to exceed the threshold 316, and the receiver powers down again after that result, and before the end of the T1 interval at 347, resulting in the power savings associated with not being powered on of the dotted waveforms 332 and 336. At time 348, the preamble correlation result 318 has increased beyond threshold 316, and after four sequential correlation results 322 which are each taken over an example 8 us (1 preamble), 16 us (two preambles), and 32 us (four preambles), packet detect 328 is asserted at time 349, and the receiver remains powered up to demodulate the Bluetooth packet which has been detected. The ADCs of FIG. 2 which were operating in a low sample rate mode sufficient for 1 Mbps of 8 us preamble detection and optionally a low bit resolution mode are changed to a high speed baseband processing mode with a sample rate sufficient to satisfy the digital signal processing of the packet which follows, and sufficient to demodulate the Bluetooth packet fields 104 of FIG. 1.

Figure 4:
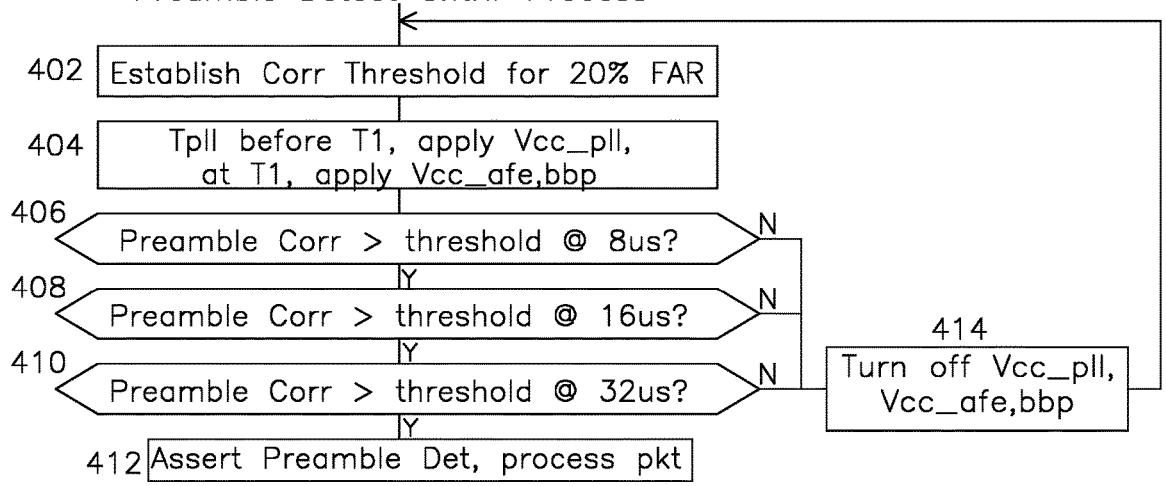
FIG. 4 shows a process for the operation of preamble correlation controller of FIG. 2.

FIG. 4 shows a flowchart for a preamble detect controller process. Each pass through the flowchart at 402 represents the time of one cycle (T1+T2). In each cycle, the preamble detect threshold 402 (280 of FIG. 2) is established, in the present examples, the threshold 402 provides a 20% FAR for each 8 us preamble sequence, but the threshold 316 may be changed to provide for other FAR values, and it may be a fixed threshold, or it may change after a successful previous correlation from a previous preamble, an unsuccessful previous correlation from a previous preamble, or other criteria. At step 404, the PLL is enabled a PLL settling time Tpll prior to the rest of the receiver processing elements of FIG. 2, which are operative in a comparatively slow and low power preamble detection configuration. Steps 406, 408, and 410 represent examination of the average of each preamble correlation result at 8 us, 16 us, and 32 us, respectively compared to the threshold established in step 402. The correlation result may be performed for each 8 us preamble segment separately to qualify the next preamble event, or the correlation result may be accumulated, with the threshold scaled to match the number of correlation events so that the accumulated correlation threshold is matched to the number of previous correlations, each having a threshold associated with a FAR of 20% or more. If the preamble correlation 318 is below that threshold at any step, the process quits 414 with power turned off prior to the end of T1, as was shown in FIG. 3. If the preamble correlation 318 is above that threshold at step 410, preamble detection is asserted and packet processing of step 412 is subsequently performed.

FIG. 5A shows an example for a Bluetooth preamble detector with a first 8 us preamble detect interval from 502 to 504, a second 8 us preamble detect interval from 504 to 506, a third 16 us preamble detect interval from 506 to 508, and a fourth 32 us preamble detect interval from 508 to 510, as previously described. In one example of the invention, the cross correlation result is accumulated and compared against a threshold which is scaled to match the FAR of an example 20% for each cross correlation interval. FIG. 5B shows the hierarchical decision tree and false alarm likelihoods given a threshold set to correctly detect 80% of the accumulative preamble detect correlation result and to false alarm detect 20% of the accumulative preamble detect correlation result. From 502 to 504, the first 8 us of the preamble detect correlation result is accumulated, which would result in a false preamble detection 522 20% of the time for the desired threshold 950. If the correlation accumulation does not exceed the example 20% FAR threshold, the packet detection stops and the preamble detector and receiver power down until the next T1 interval. If the accumulated correlation result exceeds the example 20% FAR threshold, the preamble correlation continues to a second 8 us interval from 504 to 506. At the end of the second interval 506, and using the threshold for a FAR of 20% over 8 us, the FAR is 0.2*0.2, or 4%. If the accumulated correlation result does not exceed the second interval threshold for the 8 us second interval at the end of the second interval at 506, the preamble detector powers down, otherwise the third interval 16us duration is entered and preamble correlation continues at time 508, and if accumulated preamble correlation result exceeds the third interval threshold after the third interval, preamble detect output 260 of FIG. 2 is asserted, otherwise the preamble detector powers down. The false detection rate at the end of the third interval is then $0.2^{\wedge}4=0.16\%$, which is an adequate false packet detection rate. Alternatively, at the end of the third interval 508, if the accumulated correlation result exceeds the third interval threshold, the preamble detector may enter a fourth interval of further accumulating cross correlation results over 32 us ending at 510, with preamble detect asserted if the accumulated preamble detect correlation result exceeds a fourth interval threshold.

In this manner, the duration of time the preamble detector is enabled is shortened when the preamble detect correlation result is not above a threshold, indicating a weak signal. Furthermore, by selecting a high false alarm rate threshold, and shortening the preamble detection interval when it is unlikely to detect a preamble, significant power savings may be achieved with no reduction in false preamble detection, as the preamble detector will continue to 0.16% FAR at the end of the third interval at time 508, or 0.0003% at the end of fourth interval at time 510. The various false preamble detect outcomes are shown in groupings 512, and the non-detection of preamble (accumulated preamble detect correlation result did not exceed threshold) is shown as outcome 516. The preamble false alarm rate is shown in the table of FIG. 5C, where 8 us of preamble results in 20% preamble FAR, which falls to 4% in 16 us of preamble, and to 0.15% after 32 us of preamble, which should be sufficient in almost all circumstances. Optionally, it is possible to continue for an example fourth interval, with a 0.00003% false preamble detection after 32 us of preamble. A significant power savings comes about from disabling the preamble detect by comparing the accumulated preamble detect correlation output with a threshold associated with a high FAR to determine when to stop the preamble detection early, thereby saving power by powering down the preamble detector.

Figure 5D:
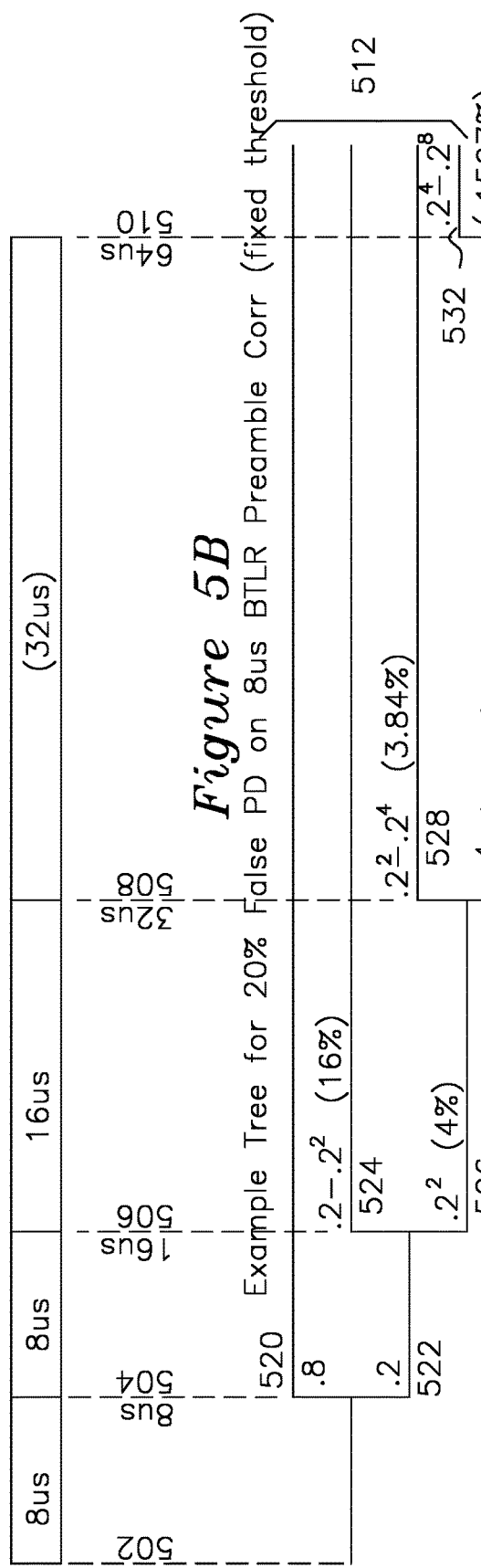
FIG. 5D shows a calculation for average preamble detection time.

FIG. 5D shows a computation for the average amount of time the preamble detector is enabled according to the method of FIGS. 5A and 5B. For the examples of FIGS. 5A and 5B, the average time the preamble detect (PD) circuit is enabled is then 100% of the time for the first interval 8 us, 20% of the time for the second interval of 8 us, 4% of the time for the third interval of 16 us, and 0.16% of the time for the fourth interval of 32 us. Multiplying this out for the example three intervals results in a 99.84% correct preamble detect, or for the example four intervals results in a 99.9997% successful preamble detect rate with an average preamble detect enable time of 10.2 us (compared to 8 us of preamble detect correlation result with an 80% preamble detect rate, or the prior art method of enabling the entire preamble detector for 80 us resulting in the previous 99.9997% preamble detect rate). Each preamble detect event is subject to stochastic variations, for the above examples with a given FAR=20% for an 8 us preamble segment, the average time for the preamble detector to be enabled before a detected preamble occurs and power down is asserted for a given FAR (0<FAR<1) using 8 us is:

$$\text{Avg\_pream\_time} = 8\ us + 8\ us * FAR + 16\ us * FAR^2 + 32\ us * FAR^4$$

More generally for intervals which double with respect to start of the packet for each subsequent interval:

$$\text{Avg\_pream\_time} = Tint1 + Tint1 * FAR + 2 * Tint1 * FAR^2 + 4 * Tint1 * FAR^4$$

where Tint1 is the preamble detect interval being doubled for each subsequent correlation accumulation interval, and FAR is the false alarm rate (false packet detect rate) for the interval Tint1 alone.

Figure 6A:
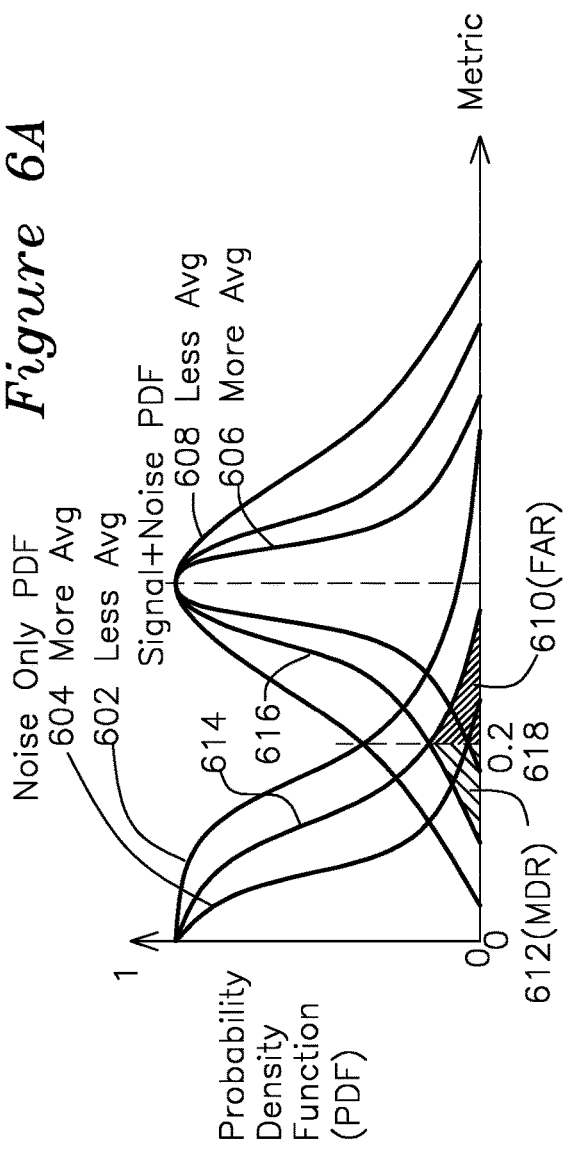
FIGS. 6A and 6B show plots for a series of probability density functions with respect to the selection of a false alarm detector threshold.

FIG. 6A shows a series of probability density functions (PDF) on the y axis for a high SNR versus a decision threshold metric such as accumulated preamble detect values on the x axis. Accordingly, the x-axis is not subject to an upper limit, and a reference metric of 0.2 618 is shown for comparison purposes.

Figure 6B:
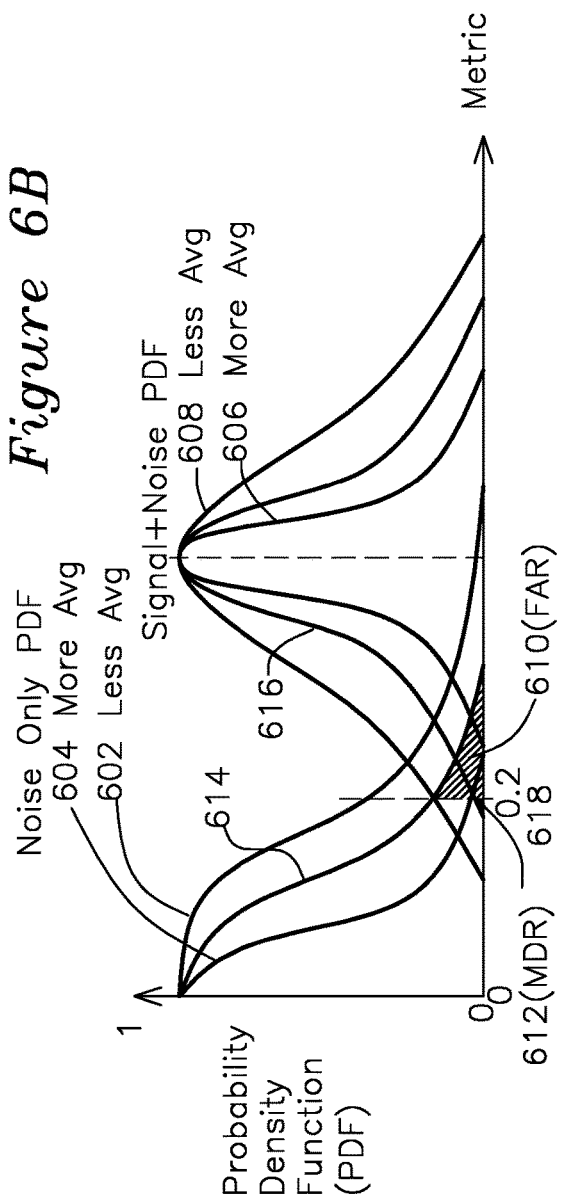

FIG. 6A may provide insight into the operation of the current invention in its most general form. Plots 602, 614, and 604 show "noise only" probability density functions for preamble detection, with plot 604 showing the result of more preamble detect correlation results and plot 602 showing less preamble detect correlation result accumulation. Similarly, plots 608, 616, and 606 show probability density functions for preamble detect signal+noise, for example the case where signal=noise, or 0 db Signal to Noise Ratio (SNR). Plot 608 shows the result of less preamble detect correlation accumulation, and plot 606 shows the result of more preamble detect correlation accumulation. For a given threshold metric (such as threshold 0.2 618 as shown) and a given amount of averaging (such as noise PDF plot 614 or Signal+Noise PDF plot 1516, the area 610 below the noise only plot 614 represents the false alarm rate (FAR), where noise with no associated preamble signal has caused the preamble detector to incorrectly assert preamble detect, and the area 612 below signal+noise plot 616 which is below threshold 618 represents the missed detect rate (MDR), representing preamble signal that was not detected because it fell below the threshold level. In the description of operation for the present invention, a threshold 618 associated with the threshold 950 of FIG. 9A which results in a 20% false alarm rate (FAR) of preamble detect output 954 for an 8 us accumulation of preamble detect correlation output as would be found in a Bluetooth packet preamble. FIG. 6B shows the same plots for a high SNR, with a greater separation in Signal+Noise PDF from the noise only PDF curves and bounded areas as described in FIG. 6A.

In one example of the invention, T1 is approximately 10 us and T2 is approximately 60us. In another example of the invention, Tpll is approximately 6us. In another example of the invention, the SYNC pattern 276 of FIG. 2 is 10 repetitions of the pattern '00111100'b. In another example of the invention, each correlation interval has an associated threshold which corresponds to a FAR greater than approximately 20% for a single preamble symbol length (such as 8 of the present example). In another example of the invention, a first (or initial) threshold for accumulated correlation is established which is associated with a FAR rate, and the subsequent thresholds are established by scaling the threshold for the initial or first threshold by the number of possible correlation samples present in the correlation of a subsequent threshold. For example, if sixteen 8 bit samples (corresponding to sampling one preamble symbol at 2× rate) is 128 for perfect correlation (representing the possible correlations), and a first threshold for particular FAR is 80, then a second threshold over two preamble symbols would be 160 at the end of a second cycle, and a third threshold over four preamble symbols would be 320 at the end of a third cycle, as a particular example for illustrating the invention and possible correlations as used to determine subsequent thresholds over various intervals of time for various correlation thresholds at the end of each correlation accumulation.

The present examples are provided for illustrative purposes only, and are not intended to limit the invention to only the embodiments shown. High speed and high frequency are understood to refer to the same characteristic, and low speed and low frequency are similarly understood to refer to the same characteristic. The use of claims terms such as "order of magnitude" is meant to include the range from 0.1× to 10× the nominal value, whereas "approximately" is understood to include the range of one half to two times the nominal value. The scope of the invention is limited only by the claims which follow.

We claim:

1. A hierarchical controller for enabling a receiver, the hierarchical controller comprising:
    an energy detector operative to detect the presence of RF as a digitized magnitude value;
    an accumulator operative to accumulate the digitized magnitude values over an interval of time and forming an accumulator value;
    a threshold detector operative to compare the accumulator value to a threshold associated with a corresponding interval of time and enabling an output when the accumulator value exceeds an associated threshold for the corresponding interval of time;
    the energy detector, the accumulator, and the threshold detector enabled during successively longer intervals of time only when the threshold detector was enabled during a previous interval of time;
    the energy detector, the accumulator, and the threshold detector otherwise disabled.

2. The hierarchical receiver of claim 1 where a threshold for a first interval of time is selected to have a false alarm rate of more than 10%.

3. The hierarchical receiver of claim 2 where a threshold for a first interval of time is selected to have a false alarm rate of less than 30%.

4. The hierarchical receiver of claim 1 where each interval of time is substantially twice the duration of a previous interval of time.

5. The hierarchical receiver of claim 1 where a number of successive intervals of time is three or four, and a packet detect output is asserted after a final successive interval of time.

6. The hierarchical receiver of claim 1 where the successively longer intervals of time are approximately 8us, 16us, and 32us in duration.

7. The hierarchical receiver of claim 1 where the energy detector, the accumulator, and the threshold detector are disabled for an interval of time less than or equal to a duration of a preamble to be received less two times a preamble detection time.

8. The hierarchical receiver of claim 1 where the RF is a Bluetooth packet.

9. A method for detection of a packet, the method comprising:
    applying power to a baseband energy detector measuring RF energy as a series of digital values, an accumulator accumulating the series of digital values over a measurement interval, and a threshold detector asserting an output when an accumulated digital value exceeds a measurement threshold associated with a corresponding measurement interval at the end of the corresponding measurement interval;
    maintaining power to the baseband energy detector, the accumulator, and the threshold detector for a sequence of detection intervals of increasing duration for as long as the threshold detector asserts the threshold detector output at the end of an associated detection interval, each detection interval being of longer duration than a previous detection interval;
    removing power from the baseband energy detector, the accumulator, and the threshold detector when the threshold detector output is not asserted at the end of a detection interval;

asserting a packet detect output at the end of at least a second, third, or fourth detection interval when the threshold detector output is asserted.

10. The method of claim 9 where the sequence of detection intervals are approximately 8us, 16us, and 32us in duration.

11. The method of claim 9 where the sequence of detection intervals are each double the duration of a previous detection interval.

12. The method of claim 9 where removing power from the baseband energy detector, the accumulator, and the threshold detector is for an interval of time of less than a duration of a preamble to be detected less two times a duration of a preamble detection interval.

13. The method of claim 12 where the preamble to be detected is the preamble of a Bluetooth packet.

14. The method of claim 12 where the measurement threshold of a first interval has a false alarm rate of more than 10%.

15. The method of claim 14 where the measurement threshold of a first interval has a false alarm rate of less than 30%.

* * * * *